United States Patent [19]

Hirose et al.

[11] Patent Number: 4,887,101

[45] Date of Patent: Dec. 12, 1989

[54] IMAGE FORMING APPARATUS

[75] Inventors: Yoshihiko Hirose; Tomohiro Aoki; Kazuyoshi Chiku, all of Yokohama; Yasushi Murayama, Tokyo; Takashi Uchida, Yokohama; Kunihiko Matsuzawa, Kawasaki, all of Japan

[73] Assignee: Canon Kabushiki Kaisha, Tokyo, Japan

[21] Appl. No.: 337,565

[22] Filed: Apr. 13, 1989

[30] Foreign Application Priority Data

Apr. 14, 1988 [JP] Japan .................................. 63-90276

[51] Int. Cl.⁴ .............................................. G01D 15/28

[52] U.S. Cl. .................................... 346/134; 346/157; 355/205; 355/327

[58] Field of Search ........................ 358/285, 296, 293; 355/205, 308, 326, 327; 346/134, 157

[56] References Cited

U.S. PATENT DOCUMENTS 4,162,843 7/1979 Inoue .................................. 355/327

4,664,501 5/1987 Koizumi .............................. 355/327

FOREIGN PATENT DOCUMENTS 62-78577 4/1987 Japan .

62-146876 6/1987 Japan .

*Primary Examiner*—H. Broome

*Assistant Examiner*—Scott A. Rogers

*Attorney, Agent, or Firm*—Fitzpatrick, Cella, Harper, Scinto

[57] ABSTRACT

The invention relates to an image forming apparatus comprising a belt-shaped member for feeding a sheet, at least one image forming means arranged in confronting relation to the belt-shaped member, a separation means for carrying out the separation between the belt-shaped member and the image forming means by shifting at least one of the belt-shaped member and image forming means, a drive means for driving the belt-shaped member, a cleaning means for cleaning the belt-shaped member, a signal generating means for emitting a signal, and a control means for separating the belt-shaped member from the image forming means by controlling the separation means and for then rotating the belt-shaped member at a predetermined speed during the image formation by controlling the drive means.

21 Claims, 11 Drawing Sheets

| FIG. 9A |
|---|
| FIG. 9B |

IMAGE FORMING APPARATUS

BACKGROUND OF THE INVENTION

1. Field of the Invention

The present invention relates to an image forming apparatus such as a laser beam printer, which uses electrophotography, and more particularly, it relates to an image forming apparatus which has a plurality of image forming portions and which can record or form a colored image or a monochromatic image on a sheet such as a transfer member fed by a belt-shaped feed means.

Further, the present invention relates to an image forming apparatus such as an ink jet printer, which can record an image on a sheet fed by a belt-shaped feed means by the use of ink droplets formed by thermal energy or other appropriate means.

2. Related Background Art

In a conventional image forming apparatus of this kind, a plurality of pairs rollers have been used as a feed means for feeding a transfer member (sheet) between a plurality of image forming portions arranged side by side. It has also already known to use a belt in place of such paired rollers.

However, when the plurality of rollers are used as the feed means, there arises a drawback that a leading edge of the sheet is damaged since the leading edge of the sheet is repeatedly pinched between the paired rollers; thus, it is hard to say that the feed means of this kind is excellent since it cannot effectively attain the increase in a feeding speed of the sheet and/or the feeding stability of the sheet according to the kinds of the sheets. Further, since a length of a feedable sheet is determined by a distance of the roller pairs, a size or dimension of the available sheet will be limited.

On the other hand, as disclosed in the Japanese Patent Laid-Open Nos. 62-78577 and 62-146876, when the belt-shaped feeding member (feeding belt) is used as the feed means to feed the sheet toward a transfer position for an image forming medium and then toward a fixing means, the sheet is fed from a sheet supply entrance to the fixing means while remaining the sheet on the feeding belt. Therefore, with the feed means of this kind, there is obtained an advantage that the possibility of erroneous or poor feeding of the sheet is less occurred than that in the case of the above-mentioned roller feed means. Further, when the roller pairs are used as the feed means, since the number of portions slidably contacted between the sheet and elements of the image forming apparatus is increased, there arises a drawback that the sheet is electrically charged due to friction and/or paper powder is generated if the sheet comprises a paper. On the contrary, when the feeding belt is used as the feed means, such problems are not occurred at all.

However, in the image forming apparatus including the belt-shaped feed means, there arise problems that toner powder used to form the image is easily adhered to the feeding belt and that, in particular if the poor feeding of the transfer sheet is occurred before the transfer sheet reaches the transfer position, the image will often be transferred onto the belt since an image bearing member is contacted with the belt. And, such smudge of the belt will cause the smudge on the back of the transfer sheet, and/or the reduction in transfer efficiency while the image is being transferred from a surface of the image bearing member to the sheet, thus causing irregularity in the transfer.

Accordingly, in the conventional image forming apparatus having the belt-shaped feed means, it was necessary to provide a cleaning mechanism for removing the toner powder adhered on the surface of the feeding belt.

However, if the image formed on the surface of the image bearing member is transferred to the feeding belt, since the image is electrically charged by a transfer charger, it will be difficult to remove the transferred image from the feeding belt. In order to remove the image completely from the belt, the belt portion onto which the image is transferred must be passed through the cleaning mechanism repeatedly, thus causing a problem that the cleaning time is extended. Particularly, in the conventional image forming apparatus wherein a plurality of image forming portions were arranged side by side in confronting relation to the feeding belt to form the colored image, since the peripheral length of the feeding belt was lengthened, it took a considerably long time to clean the whole feeding belt, and, thus, there arose a problem that a normal condition (i.e., image formable condition) could not be restored for a short time if the poor feeding was occurred.

SUMMARY OF THE INVENTION

Accordingly, the present invention is directed to an apparatus which can solve the aforementioned conventional drawbacks, and, thus, an object of the present invention is to provide an image forming apparatus which can reduce a cleaning time for removing or cleaning the smudge on a feed means, which causes deterioration of a recorded image.

Another object of the present invention is to provide an image forming apparatus which can clean the smudge on the feed means automatically for a short time by a removing a jammed sheet, if the sheet is jammed.

In order to achieve the above-mentioned objects, according to the present invention, there is provided an image forming apparatus wherein an image formed at an image forming portion is transferred to a transfer member fed by a belt-shaped feed means and a smudge on the belt feed means generated during the feeding operation is cleaned by means of a cleaning means, and wherein the feed means is so arranged that it can be contacted with or separated from the image forming portion, and, when the separated feed means is cleaned by the cleaning means, the feed means is driven at a speed faster than a speed at which the feed means is driven during the image forming operation.

DETAILED DESCRIPTION OF THE PREFERRED EMBODIMENTS

The present invention will now be explained with reference to the accompanying drawings.

Figure 1:
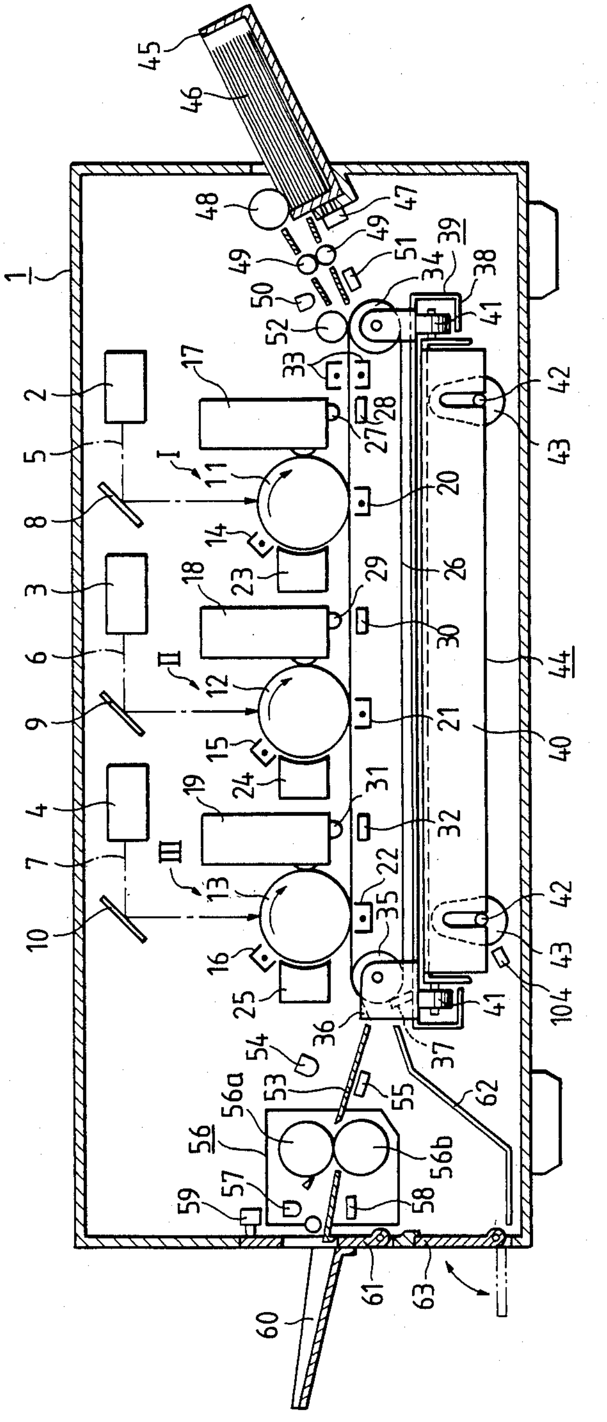
FIG. 1 is a schematic sectional view of a full color laser beam printer embodied as a preferred embodiment of an image forming apparatus according to the present invention.
Figure 2:
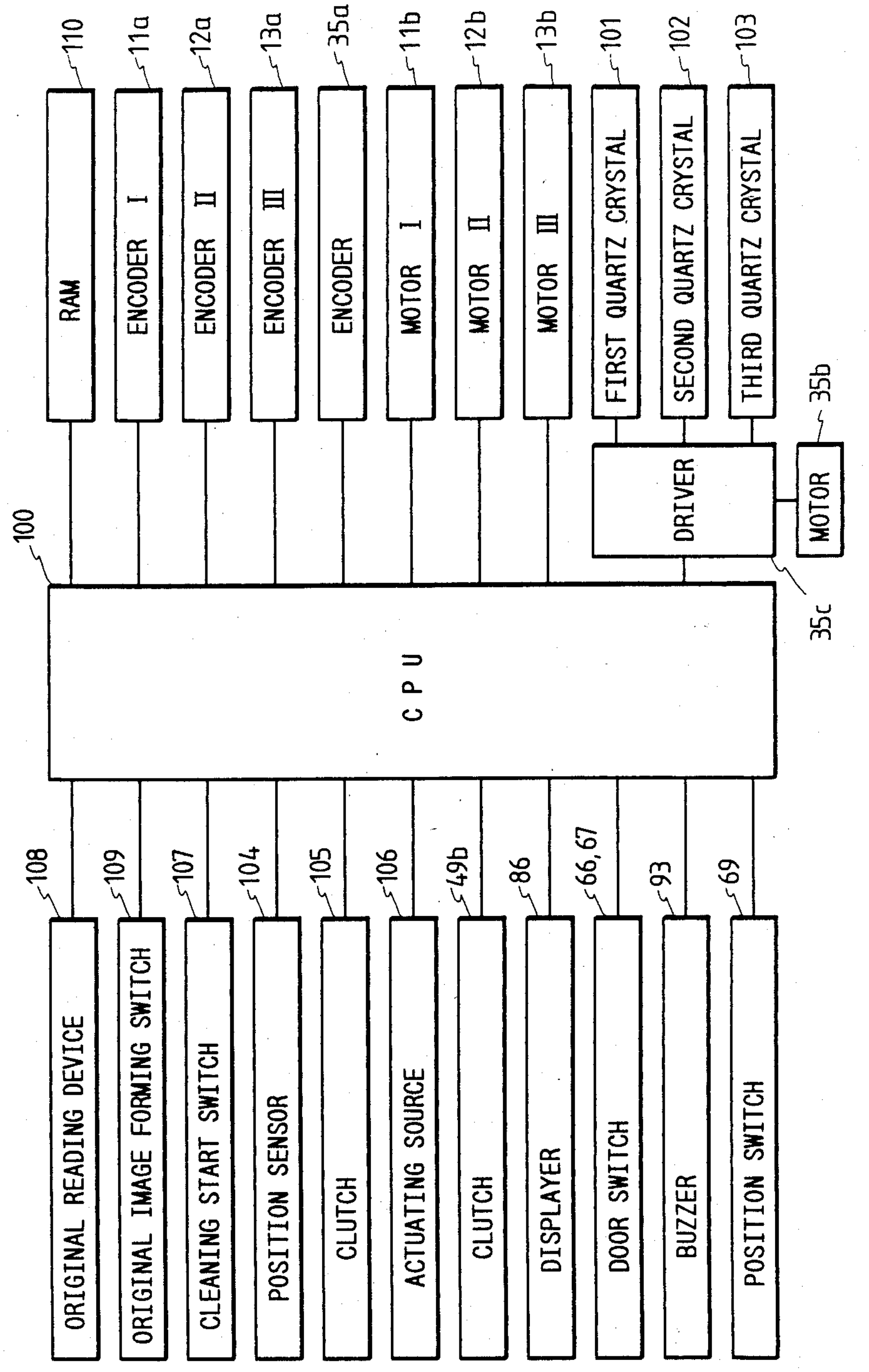
FIG. 2 is a control block diagram for the apparatus of FIG. 1.

FIG. 1 shows a schematic arrangement of a laser beam printer (referred to as "LBP apparatus:" hereinafter) according to a preferred embodiment of an image forming apparatus of the present invention, and FIG. 2 shows a control block diagram for controlling the LBP apparatus of FIG. 1. In the LBP apparatus 1, three images colored by magenta, cyan and yellow toners by an electrophotographic technique are formed, and then, these toner images are successively transferred and superimposed onto a sheet such as a transfer member, thereby providing a full color image through a subtractive color process.

In the illustrated embodiment, the LBP apparatus 1 includes three image forming portions, I, II and III, below which a feed means 39 comprising a feeding belt 26 for feeding a transfer member is arranged. In a feeding path through which the transfer sheet is fed, on a downstream side of the feed means 39, there is provided a fixing means 56 including a pair of rollers 56*a* and 56*b*, for fixing a transferred image on the transfer sheet. The image forming portions I–III include means for forming an image, such as electrophotographic photosensitive drums 11, 12, 13 each rotated at a constant speed, primary chargers 14, 15, 16; developers 17, 18, 19; transfer chargers 20, 21, 22 and cleaners 23, 24, 25, respectively. Each of the photosensitive drums 11, 12, 13 is contacted at its peripheral surface with the feeding belt 26. Alternatively, the peripheral surface of each photosensitive drum 11, 12, 13 may be situated in the vicinity of the feeding belt 26 in such a manner that the drum does not contact with the belt, but is so spaced apart from the belt as to contact with the transfer sheet fed on the feeding belt 26.

Image signals inputted to the respective image forming portions I–III are constituted by three image signals associated with red, blue and green color components obtainable by decomposing the color of an original image to be recorded. The image signals associated with these color components are sent to the corresponding image forming portions successively (serially) at a predetermined time intervals. For example, in the illustrated embodiment, among a plurality of signals inputted to the LBP apparatus 1 from external apparatuses, the green component image signal firstly send (from the associated external apparatus) is inputted to a laser scanner 2 of the image forming portion I.

In response to the green component image signal (i.e., image signal associated with the green component), the laser scanner 2 emits laser beams 5 modulated by a laser diode incorporated in the scanner toward a rotating polygonal mirror to create a parallel scanning beams. The laser beams 5 are then reflected by a reflection mirror 8 to direct it onto the photosensitive drum 11, where the laser beams are focused on the surface of the drum, thereby scanning the drum 11 in a direction perpendicular to a rotational direction of the drum. By such operation of the laser scanner 2, a latent image corresponding to the green component of the original image is formed on the surface of the photosensitive drum 11 uniformly charged by the charger 14.

The latent image formed on the photosensitive drum 11 is developed and visualized by magenta toner filled in the developer 17. The developed image visualized by magenta toner is transferred onto a transfer member (sheet) 46 laid on and moved by the feeding belt 26, through the medium of the transfer charger 20.

After the magenta image is transferred to the transfer sheet 46, the red component image signal (i.e., image signal associated with the red component) is inputted to a laser scanner 3 of the image forming portion II. Similarly to the above-mentioned processes regarding the green component image signal, a latent image formed on the photosensitive drum 12 is developed and visualized by cyan toner filled in the developer 18. The cyan image is then transferred onto the transfer sheet 46 fed from the direction of the photosensitive drum 11 in superimposition on the magenta image.

After the cyan image is superimposed on the magenta image, the blue component image signal (i.e., image signal associated with the blue component) is inputted to a laser scanner 4 of the image forming portion III. Similarly to the above-mentioned processes, an yellow image is formed on the photosensitive drum 13. The yellow image is then transferred onto the transfer sheet 46 laid on the feeding belt 26 and fed from the direction of the photosensitive drum 12 in superimposition on the cyan image.

Through a series of the aforementioned processes, the magenta, cyan and yellow toner images have been transferred to the transfer sheet 46 in superimposing relation. The transfer sheet 46 is then fed to the fixing means 56 by the feeding belt 26. The colored toners transferred to the transfer sheet 46 are heated and pressurized while passing through the paired rollers 56*a* and 56*b* of the fixing means 56, thereby being fused and subject to the subtractive process to provide the full color recorded image fixed on the transfer sheet 46.

If the color component images formed at the image forming portions are not transferred to the same area on the transfer sheet 46 in the overlapping relation, a shear or aberration in colors of the recorded image will occur, thus worsening the image quality considerably. Therefore, by using a microcomputer (CPU) 100 (FIG. 2), the peripheral rotational speeds of the photosensitive drums 11, 12 and 13 are controlled to be the same as the moving speed of the feeding belt 26 with high accuracy. To this end, encoders (I–III) 11*a*, 12*a* and 13*a* are provided on rotary shafts of the photosensitive drums 11, 12 and 13, respectively, and an encoder 35*a* is provided on a rotary shaft of a driving roller 35 for driving the feeding belt 26, thereby detecting the rotational speed and wow-flatter of each of the elements 11–13, 35.

Further, Motors (I–III) 11*b*, 12*b* and 13*b* for driving the rotary shafts of the corresponding photosensitive drums 11–13 are PLL (phase-locked loop) controlled on the basis of a reference pulse emitted from a first quartz crystal 101.

A motor 35*b* for driving the driving roller 35 comprises a pulse motor controlled by a driver 35*c* including the above-mentioned first quartz crystal 101 for driving the feeding belt 26 at the same peripheral speed as those of the photosensitive drums 11–13, a second quartz crystal 102 having a frequency more than that of the first quartz crystal 101 by three times, and a third quartz crystal 103 having a frequency corresponding to about a half of the frequency of the first quartz crystal when the photosensitive drums 11–13 are driven at the same peripheral speed as that of the belt. The driver 35*c* serves to switch over the inputted reference pulses and to execute the PLL control, in accordance with the command from the microcomputer 100.

Consequently, the motor 35*b* for driving the driving roller 35 can selectively set three kinds of feeding speeds through the microcomputer 100.

Next, the transfer sheet feed means 39 of the LBP apparatus 1 will be explained in more detail.

The sheets (transfer members) 46 each cut in a predetermined size are stacked in a cassette 45. When the cassette 45 is mounted on the LBP apparatus 1, it pushes a cassette detection switch 47, whereby a cassette mounted signal is sent to the microcomputer 100 in the LBP apparatus 1.

Further, when the cassette 45 is mounted on the LBP apparatus 1, an uppermost transfer sheet 46 is pressed against a feed roller 48. When the feed roller 48 is rotated, the uppermost transfer sheet 46 is drawn from the cassette 45 due to a difference between a friction force between the uppermost transfer sheet 46 and the feed roller 48, and a friction force between the uppermost transfer sheet 46 and a next adjacent transfer sheet. The uppermost transfer sheet 46 is then pinched by regist rollers 49 and is fed by these regist rollers until the light emitted from a lamp 50 to a photosensor 51 (these elements 50, 51 constitute a detection means for detecting a leading edge of the transfer sheet) is interrupted by the leading edge of the transfer sheet 46. When the leading edge interrupts the light path between the lamp 50 and the photosensor 51, the regist rollers 49 are stopped while pinching the transfer sheet 46 therebetween.

As the latent image is begun to be formed on the surface of the photosensitive drum 11 by the action of the laser scanner 2, the regist rollers 49 are rotated again at a timing that the magenta toner image can be transfer to the transfer sheet, thus feeding the transfer sheet 46 (which is being pinched by the regist rollers) onto the feeding belt 26. The feeding belt 26 is made of transparent or semi-transparent resin material such as polyurethane. A surface of the feeding belt 26 is electrically charged by an attraction charger 33 to electrostatically attract the transfer sheet 46 thereto so that the transfer sheet 46 can be fed stably during the operation of the LBP apparatus. Further, in order to ensure that the transfer sheet 46 fed by the regist rollers 49 is electrostatically adhered to the feeding belt 26 wholly without waving on the feeding belt, the transfer sheet 46 is pressed against the feeding belt 26 by means of a driven roller 34 and a holder roller 52.

The developers 17, 18 and 19 containing the respective colored toners are provided at their bottoms with lamps 27, 28 and 31, respectively, thus illuminating substantially parallel light beams on the feeding belt 26. On the other hand, photodiodes 28, 30 and 32 are arranged in confronting relation to the corresponding lamps 27, 29 and 31 with the interposition of the feeding belt 26 to detect amounts of light emitted from the lamps 27, 29 and 31 and passed through the feeding belt 26.

After the color component images are successively transferred from the photosensitive drums 11, 12 and 13 to the transfer sheet 46, the transfer sheet 46 is separated or peeled from the surface of the feeding belt 26 by means of a separation pawl 36, and then is fed to the fixing means 56 through a feeding path 53. After the fixing operation is completed, the transfer sheet 46 is ejected or discharged in a tray 60.

On the other hand, the feeding belt from which the transfer sheet 46 is separated is passed through a conductive blade 37 constituting the cleaning means, where the toner and/or paper powder adhered on the surface of the feeding belt is removed (i.e., cleaned) and the electric charge is also removed from the feeding belt.

The above-mentioned transfer chargers 20, 21, 22; photodiodes 28, 30, 32; feeding belt 26; attraction charger 33, driven roller 34, driving roller 35, separation pawl 36 and conductive blade 37 are assembled on a frame 38, and constitute the above-mentioned feed means 39.

Figure 3:
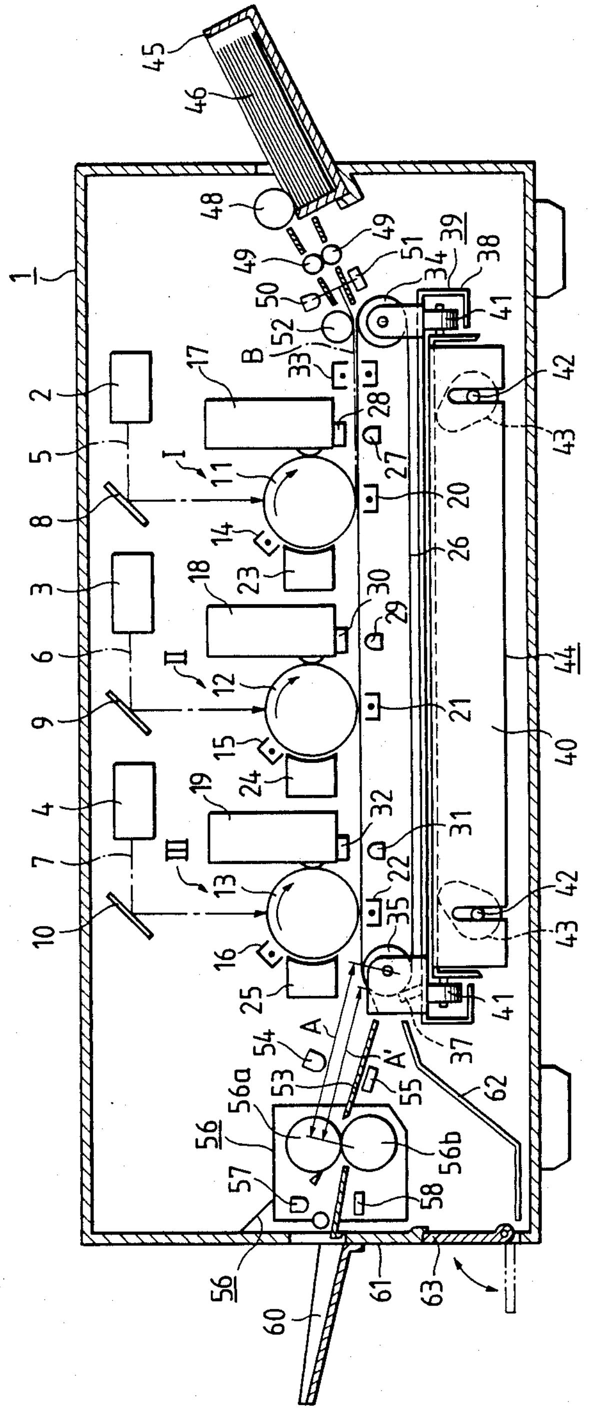
FIG. 3 is a schematic sectional view of the apparatus of FIG. 1, showing a condition that a feed means is held in an intermediate position.
Figure 4:
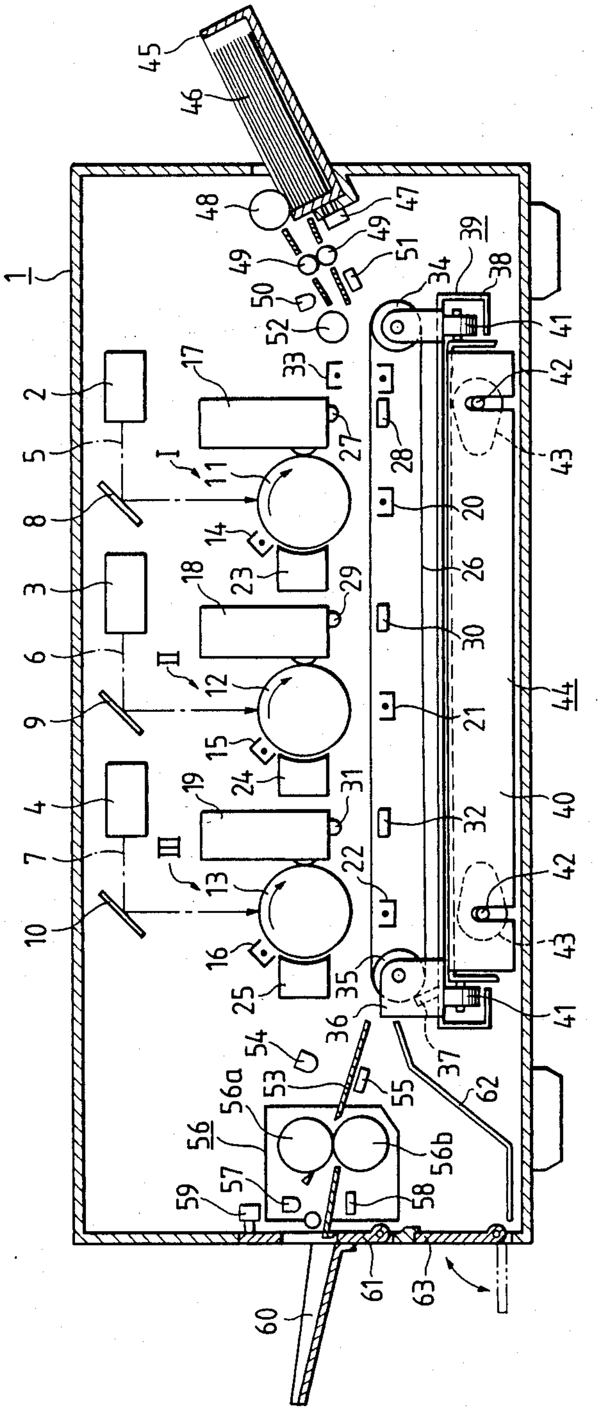
FIG. 4 is a schematic sectional view of the apparatus of FIG. 1, showing a condition that the feed means is held in a lowermost position.

The feed means 39 is supported by rollers 41 rotatably mounted on a lifter frame 40. The lifter frame 40 is supported by cams 43 so that the height of the lifter frame can be changed, as shown in FIGS. 1, 3 and 4, in accordance with the rotation of the cams 43 due to rotation of corresponding cam shafts 42. The cam shafts 42 are drivingly connected to a position sensor 104 (FIG. 2) so that the position of the lifter frame 40 can be detected on the basis of a signal outputting condition of the position sensor 104. Further, the cam shafts 42 are connected to an actuating source 106 through a clutch 105 controlled by the microcomputer 100 in the LBP apparatus 1.

The above-mentioned lifter frame 40, rollers 41, cam shafts 42, cams 43 and the like constitute a rising/lowering unit 44 for changing the height position of the feed means 39. The rising/lowering unit 44 and the feed means 39 are so set that, when the feed means 39 is lifted to an uppermost position thereof by the rising/lowering unit 44, the feeding belt 26 can be contacted with the surfaces of the photosensitive drums 11–13.

Figure 5:
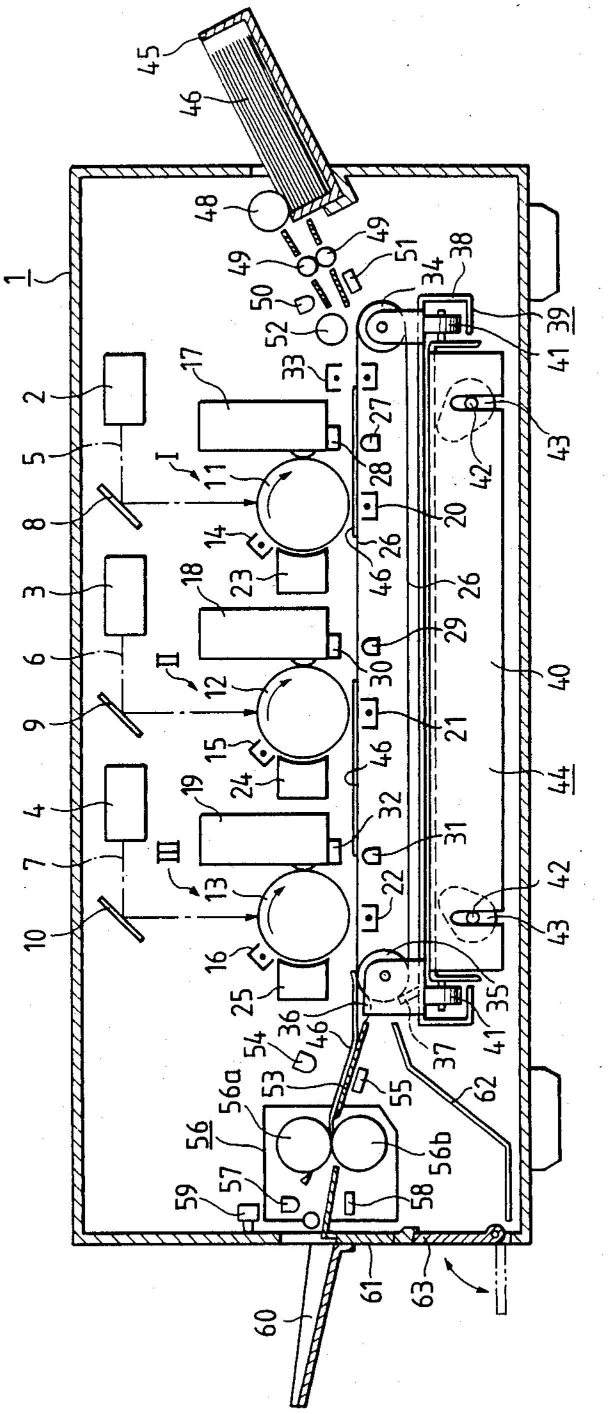
FIG. 5 is a schematic sectional view of the apparatus of FIG. 1, showing a feeding path, when a transfer member is fed in the condition shown in FIG. 3.

Further, as shown in FIG. 3, by slightly lowering the position of the feed means 39, the feeding belt 26 can be separated from the photosensitive drums 11–13. Incidentally, in this condition, the transfer sheet 46 can be fed to the fixing means 56 without contacting with the photosensitive drums 11–13 (i.e., in a condition that the image cannot be transferred to the sheet) (see FIG. 5). In the illustrated embodiment, the position of the feed means shown in FIG. 3 is referred to as "intermediate position".

A feeding distance A between the nip of the rollers 56*a*, 56*b* of the fixing means 56 and the driving roller 35 is determined by a minimum length of the transfer sheet usable in the image forming apparatus 1. Further, in the illustrated embodiment, in order to ensure that the transfer sheet is fed correctly, the transfer sheet is electrostatically attracted onto the feeding belt 26, as mentioned above. With this arrangement, the transfer sheet is fed up the vicinity of a turned portion of the feeding belt 26 at the driving roller 35 while being attracted to the feeding belt. As a result, an actual space used that the transfer sheet forms a loop is, as shown by a feeding distance A' (FIG. 3), still shorter than the aforementioned feeding distance A.

Figure 6:
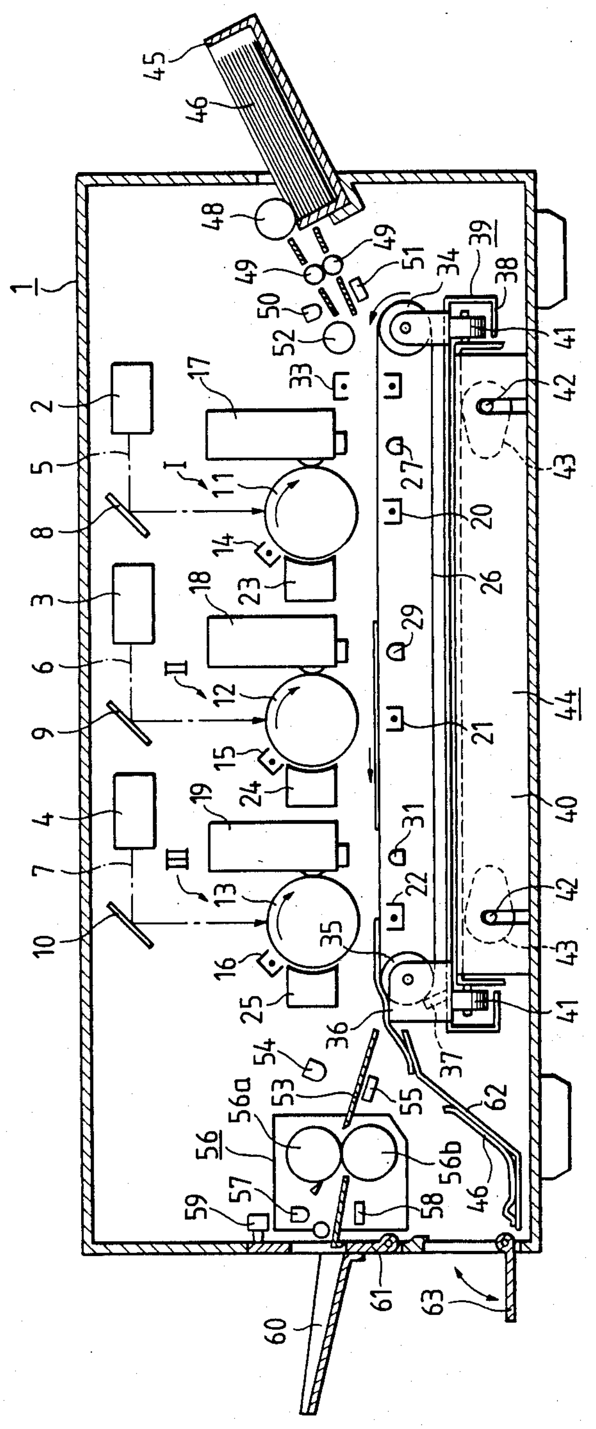
FIG. 6 is a schematic sectional view of the apparatus of FIG. 1, showing the feeding path, when the transfer member is fed in the condition shown in FIG. 4.

Further, as shown in FIG. 4, when the feeding belt 26 is driven to feed the transfer sheet 46 in a condition that the feed means 39 is lowered to a "lowermost" position, the transfer sheet 46 is separated from the feeding belt 26 by means of the separation pawl 36 to be ejected toward a discharge path 62. In this way, the transfer sheet 46 fed to the discharge path 62 is not passed through the fixing means 56, and, as shown in FIG. 6, can be removed from the LBP apparatus 1 after a discharge cover 63 is opened. In this case, in the condition that the feed means 39 is lowered to the lowermost position as shown in FIG. 3, when outer front doors 64 and 65 (FIG. 7) of the LBP apparatus 1 are opened, by pulling the feed means 39 toward this side, the feed unit 39 can be drawn out of the LBP apparatus while being supported by rollers 43.

By the way, in the illustrated embodiment, a timing of the image forming operation sequence is set on the basis of a signal from the above-mentioned photodiode 51. Now, a method for setting the operation timing on the basis of the signal emitted from the photodiode 51 will be explained.

In FIG. 1, when the transfer sheet 46 is fed into the LBP apparatus 1 by means of the regist rollers 49, while the transfer sheet 46 is being passed across the light path between the lamp 50 and the photodiode 51, the light from the lamp to the photodiode is interrupted by the transfer sheet. Immediately after a trailing edge of the transfer sheet 46 has passed the light path, the light from the lamp 50 reaches the photodiode 51 again, thus changing a value of the output signal of the photodiode 51.

Since distances from the photodiode 51 to nip portions between the photosensitive drums 11, 12, 13 and the feeding belt 26, and the feeding speed of the feeding belt 26 are previously determined, it is possible to calculate time intervals from when the trailing edge of the transfer sheet 46 leaves the photodiode 51 to when the transfer sheet passes through the nip portions between the feeding belt 26 and the photosensitive drums 11, 12, 13. For example, the time required that the trailing edge of the transfer sheet 46 passes through the nip portion between the feeding belt 26 and the photosensitive drum 11 can be given by dividing a feeding distance B (FIG. 3) between the photodiode 51 and the nip portion of the photosensitive drum 11 by the feeding speed of the feeding belt 26.

The times required that the trailing edge of the transfer sheet 46 passes through the nip portions between the feeding belt 26 and the photosensitive drums 11, 12, 13 so calculated are stored or memorized. On the basis of these time informations and the signal from the photodiode 51, the image forming operation are carried out.

Next, a method for detecting the poor feeding of the transfer sheet 46 in the LBP apparatus 1 will be explained. Basically, upon starting of one operation, if a value of an output signal of any photodiode arranged in the feeding path for the transfer sheet does not change even after a predetermined set time interval has been elapsed, that is to say, if the light from a corresponding lamp to said photodiode is not interrupted even after the predetermined set time interval has been elapsed, it is judged that the poor feeding of the transfer sheet has occurred in the feeding path up to said photodiode. Any conventional photodiode and the corresponding lamp for detecting the poor feeding of the transfer sheet may be used.

The above-mentioned set time intervals can be selected as time intervals required that the transfer sheet is fed up to any poor feeding detection means (photodiodes and lamps).

Now, a method for restoring the poor feeding of the transfer sheet in the LBP apparatus 1 constructed above will be explained.

As stated above, if the poor feeding of the transfer sheet 46 occurs in the feeding path between the cassette 45 and the photosensitive drum 13 with the result that the transfer sheet was not fed to the transferring positions at the predetermined transferring timing regarding the images formed on the photosensitive drums 11–13, the images formed on the photosensitive drums 11–13 will be transferred to the feeding belt 26. That is to say, in such a case, at each of the transferring positions, the surface of the photosensitive drum will be contacted with the feeding belt 26, thus transferring the image to the feeding belt 26. In order to avoid such miss transferring, according to the illustrated embodiment, the following operation is carried out.

That is to say, when the poor feeding of the transfer sheet is detected by any conventional poor feeding detection means, first of all, the photosensitive drums 11–13 and the feeding belt 26 are stopped by the signal from the microcomputer 100, and then the rising/lowering unit 44 is actuated to separate the feeding belt 26 from the photosensitive drums 11–13. Next, an operator removes the transfer sheet causing the poor feeding from the LBP apparatus 1 and then closes the front doors 64, 65 (FIG. 7) of the LBP apparatus. Thereafter, the photosensitive drums 11–13 are rotated again and the surfaces of the drums are cleaned by the corresponding cleaners 23–25. And, at the same time, by the signal from the microcomputer 100, the first quartz crystal 101 is switched over to the second quartz crystal 102 to generate the reference pulses having the frequency more than that in the case where the transfer sheet is being fed by three times, so that the surface of the feeding belt 26 can be cleaned by the conductive blade 37 while driving the feeding belt at a speed faster, three times, than the feeding speed in the case where the images are being correctly transferred. Further, after the toner adhered to the feeding belt 26 is removed completely by means of the conductive blade 37 by turning the feeding belt by a few revolutions, the second quartz crystal 102 is switched again to the first quartz crystal 101 for carrying out the image forming operation to restore the frequency of the reference pulses to the original condition, and the second quartz crystal is disenergized.

After the above-mentioned cleaning operation has been completed, by the signal from the microcomputer 100, the rising/lowering unit 44 is actuated again to contact the feeding belt 26 with the surfaces of the photosensitive drums 11–13, thereby restoring the recordable condition, thus waiting a next recording operation.

Next, the above-mentioned operations will be explained in more detail with reference to a flow chart shown in FIGS. 8 and 9.

Generally, the poor feeding of the transfer sheet regarding the feeding belt 26 is occurred by two groups of causes. One of the causes is derived from the fact that the transfer sheet 46 fed by the regist rollers 49 is jammed at a position of the holder roller 52 and thus the transfer sheet is not electrostatically attracted to the feeding belt 26. The other cause is derived from the fact that the electrostatic attraction force of any surface of the photosensitive drum 11, 12 or 13 is stronger than the electrostatic attraction force of the surface of the feeding belt 26 to attract the transfer sheet to said surface of the photosensitive drum 11, 12 or 13 with the result that the transfer sheet is moved to the cleaner 23, 24 or 25 where the transfer sheet is jammed.

The poor feeding of the transfer sheet occurred at the holder roller 52 is detected by the microcomputer 100 when the transfer sheet 46 does not reach the light path between the lamp 27 and the photodiode 28 within the predetermined set time interval a after the transfer sheet being pinched by the regist rollers 49 (in the condition that the leading edge of the sheet interrupts the light path between the lamp 50 and the photodiode 51) is begun to move due to the rotation of the regist rollers 49, that is to say, when the value of the output signal of the photodiode 28 does not change above or below a predetermined limit within the predetermined set time interval. The jam of the transfer sheet 46 at the cleaner 23 is detected, similar to the above, when the value of the output signal of the photodiode 30 does not change above or below a predetermined limit within the predetermined set time interval b after the value of the output signal of the photodiode 28 has changed. The jam of the transfer sheet 46 at the remaining cleaners 24, 26 can also be detected, similar to the above, by using the photodiodes 30, 32 and 55, on the basis of the predetermined set time intervals b and c.

Now, a sequence for eliminating the poor feeding occurred at the feeding belt 26 will be explained with reference to FIGS. 8 and 9.

In a step S101, when an image forming start command is outputted from the microcomputer 100, each of the motors and the actuating source are energized at predetermined timings to feed the transfer sheet 46 out of the cassette 45 by means of the feed roller 48. In a step S102, if the leading edge of the transfer sheet 46 is detected within the set time interval a, the transfer sheet 46 is once stopped by stopping the regist rollers 49. The transfer sheet is fed out again at a timing synchronous with the operation of the optical system such as the laser scanners 2, 3, 4 and the like. Such re-feeding operation of the transfer sheet can be carried out by controlling a clutch **49*b* connecting the regist rollers 49 to the actuating source 106. Next, the transfer sheet is fed by the feeding belt 26, during which the image formed on the photosensitive drums 11–13** are transferred to the transfer sheet successively.

Figure 8:
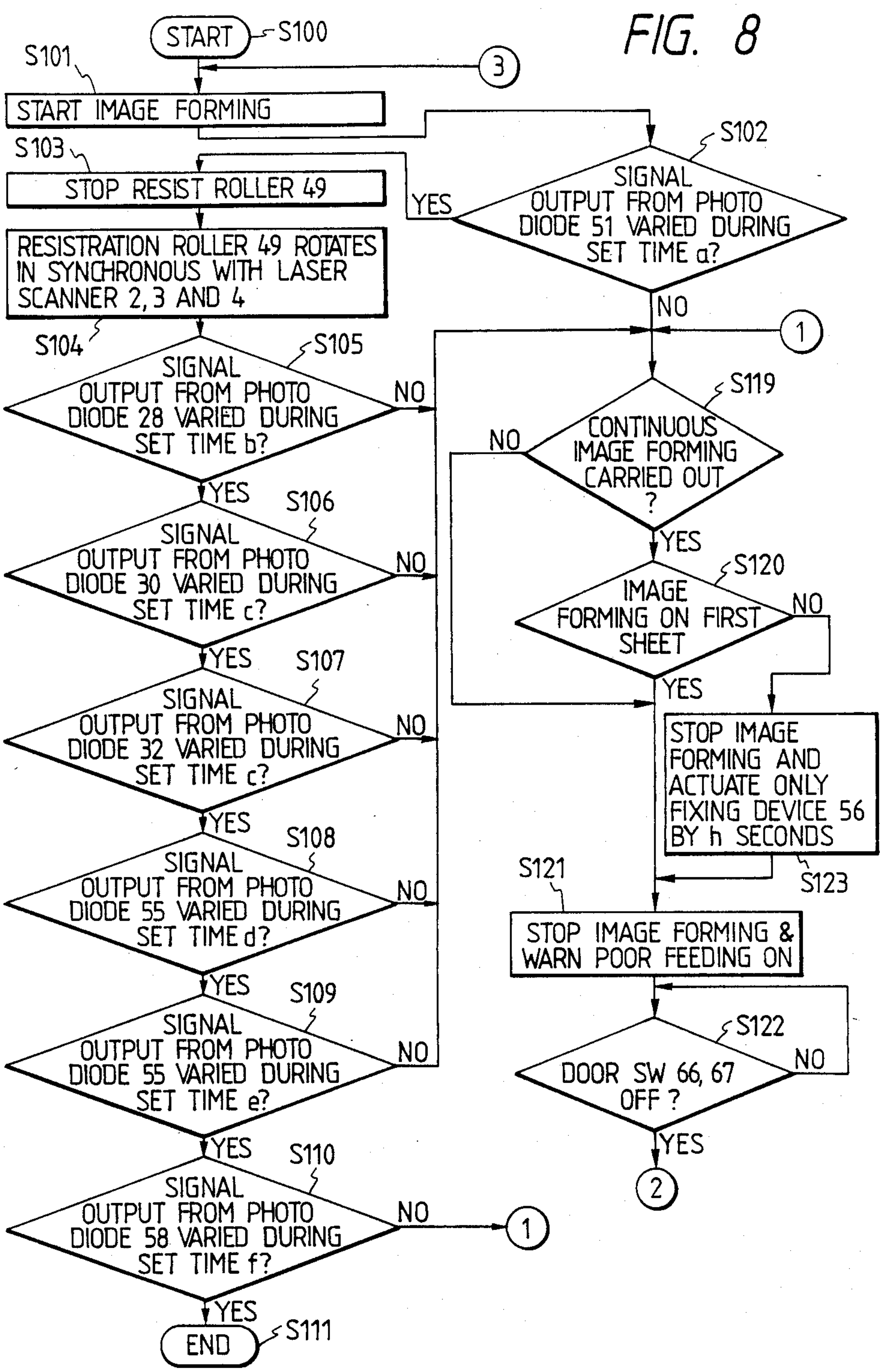
FIGS. 8, 9, 9A, and 9B show a control flow chart for the apparatus of FIG. 1.
Figures 9, 9A:
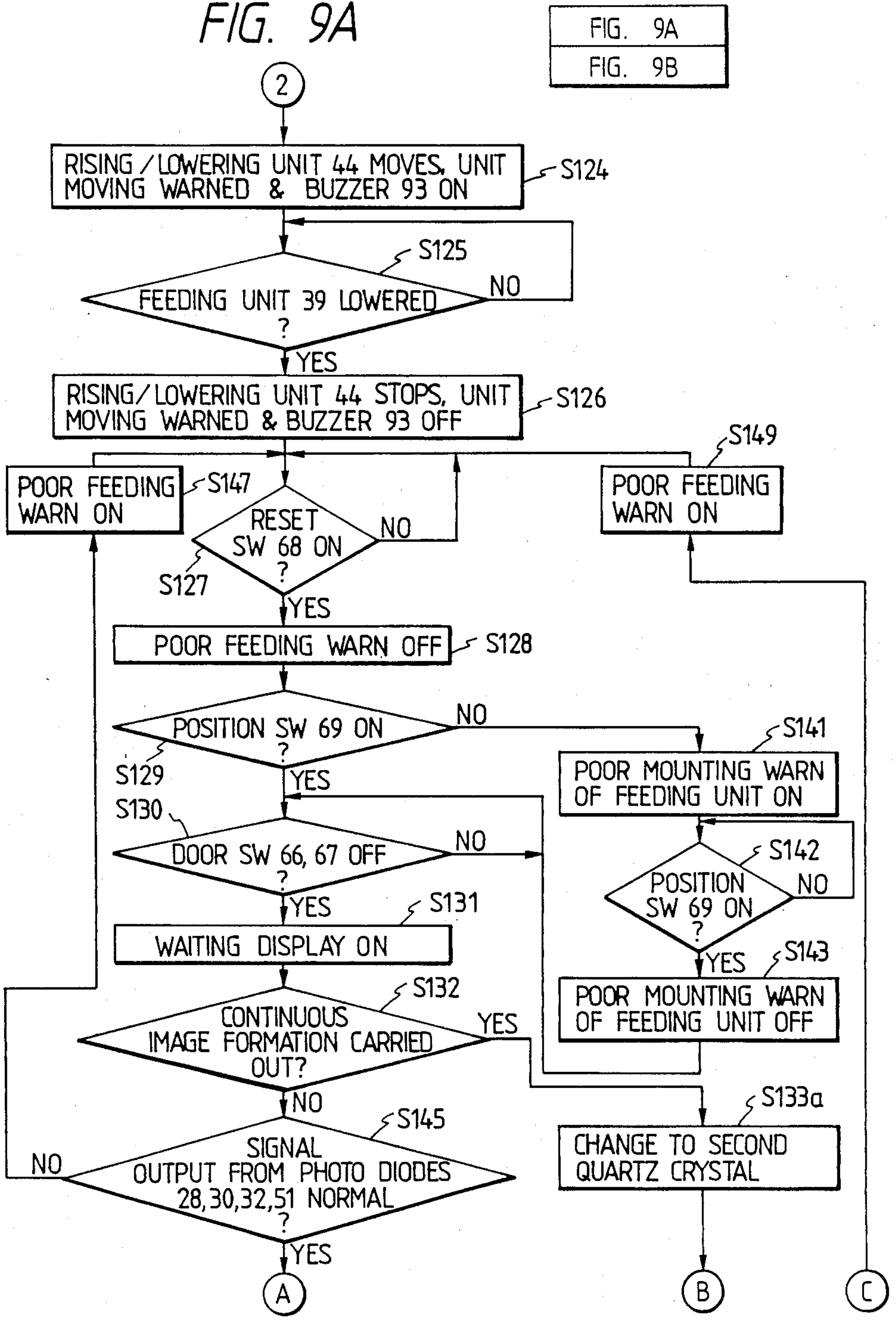
Figure 9B:
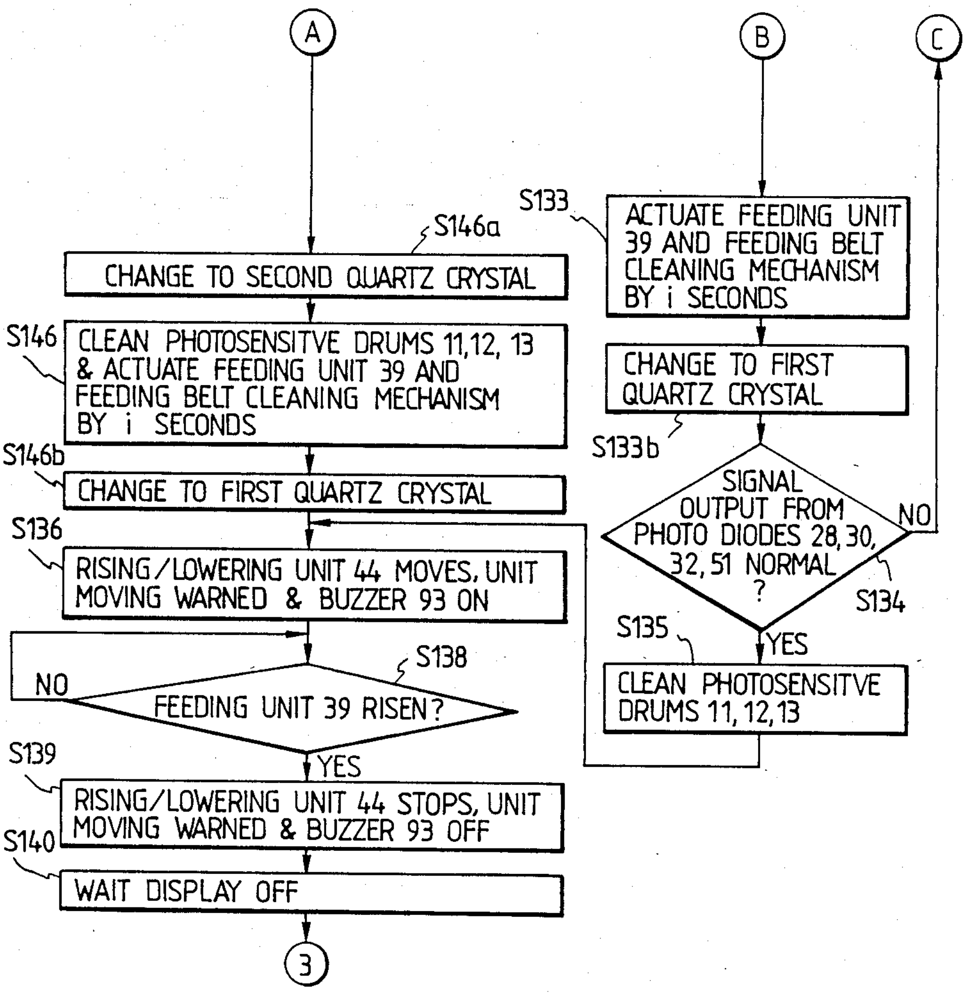
Figure 10:
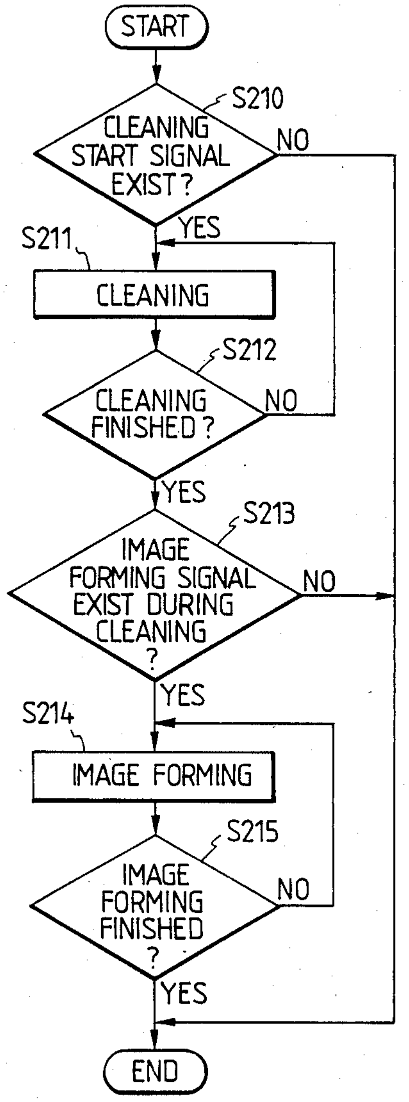
FIGS. 10 and 11 show a control flow chart for an image forming apparatus according to another embodiment of the present invention.

In steps S105, S106, S107 and S108 shown in FIG. 8, if the poor feeding of the transfer sheet at the feeding belt 26 as mentioned above is detected, the microcomputer 100 immediately stops the image forming operation, when the images are recorded on only a single sheet or when the images are recorded on a first sheet firstly fed after the continuous image forming operation is initiated (steps S119 and S120), thus causing a displayer 86 of the LBP apparatus 1 to warn the poor feeding (step S121). In the continuous image forming operation, if the poor feeding regarding a transfer sheet being fed on the way occurs (i.e., if NO in the step S120), the sequence of a step S123 is carried out. That is to say, immediately after the poor feeding is detected, all of the elements engaging the image forming operation in the LBP apparatus 1, except the fixing means 56 are stopped.

The fixing means or fixing device 56 is actuated by a predetermined set time h after the poor feeding is detected, to fix the images only to the transfer sheet on which the three color toner images have been transferred and which has been fed from the feeding belt 26 (step S123). The fixed sheet is effected in the tray 60. When the set time h is elapsed, the whole operation of the LBP apparatus 1 is stopped, and a warning of the poor feeding is displayed on a control panel (step S121).

Figure 7:
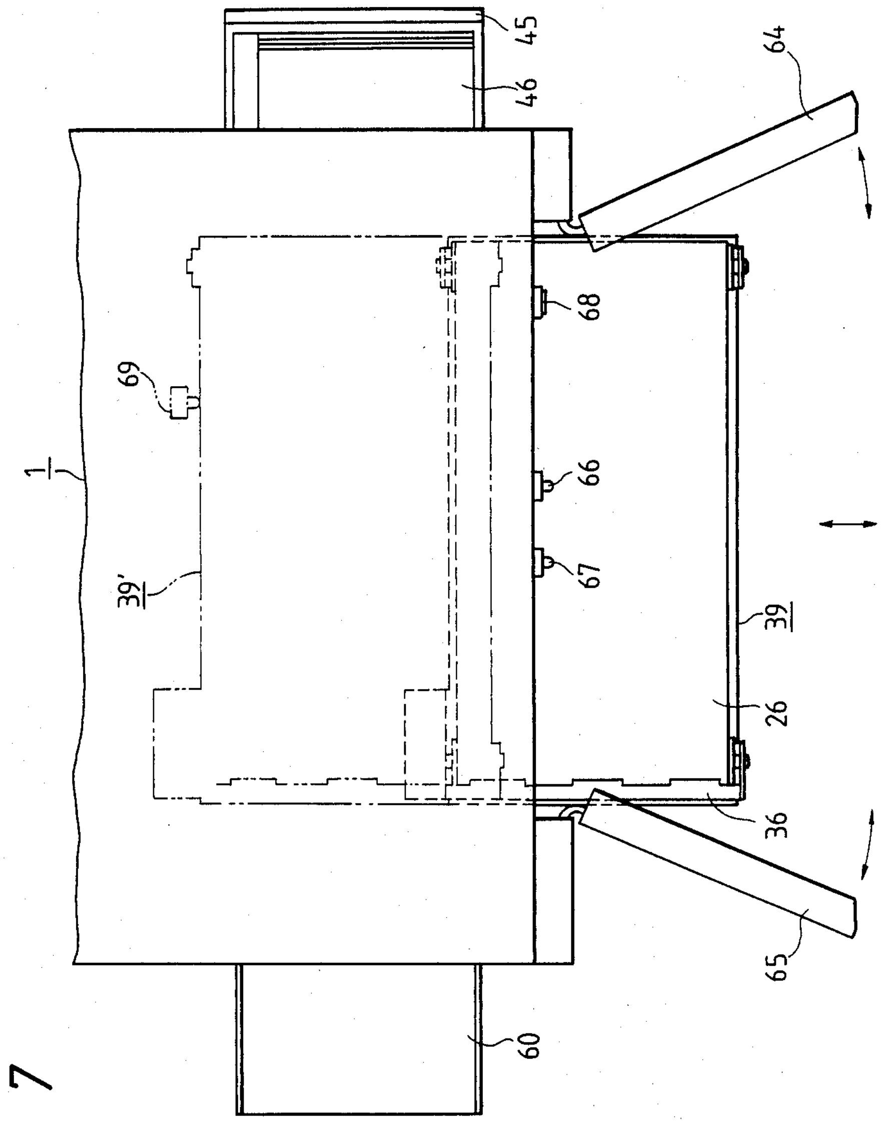
FIG. 7 is a plan view of the apparatus of FIG. 1, showing a condition that a door is opened and the feed means extracted or drawn out.

As shown in FIG. 7, when the operator opens the right and left front doors 64 and 65 in order to remove the transfer sheet causing the poor feeding, pins and electrical contacts (not shown) of door switches 66 and 67 being pushed by the closed doors 64, 65 are returned to their original positions by the action of springs (not shown), thus interrupting signal lines (not shown) to the microcomputer 100. When the signals from the door switches 66, 67 are interrupted (step S122), the sequence 3 for eliminating the poor feeding as shown in FIG. 9 is carried out.

When the door switches 66, 67 are turned OFF, the microcomputer 100 actuates the rising/lowering unit 44 through the actuating source 106 and confirms that the feed means 39 is lowered to the lowermost position through a position sensor 104 (step S125), and, at the same time, displays the warning of the movement of the rising/lowering unit on the control pane (not shown) of the LBP apparatus 1 and energizes a buzzer 93 (step S124). When the rising/lowering unit 44 is stopped and thus the lowering movement of the feed means 39 is stopped, the warning of the movement of the rising/lowering unit is disappeared, and the buzzer 93 is turned OFF (step S126).

Consequently, the space is formed between the photosensitive drums 11, 12, 13 and the feeding belt 26. Then, as shown in FIG. 7, by drawing the feed means 39 out of the LBP apparatus 1, it is possible to remove the transfer sheet 46 causing the poor feeding. Further, the warning of the poor feeding can be disappeared by pushing a reset switch 68 (steps S127, S128). When the operator pulls the feed means 39 toward this side in order to remove the transfer sheet causing the poor feeding, the signal flowing to the position switch 69 is interrupted, thereby displaying a warning of poor mounting of the feed means (feeding unit) 39 on the control panel of the LBP apparatus 1 (step S141).

When the front doors are closed again after the transfer sheet is removed and the feed means 39 is inserted into the LBP apparatus 1, the warning of the poor mounting of the feeding unit on the control panel is disappeared, and, alternatively, a waiting display representing preparation of the operation is appeared on the control pane (steps S130, S131, S142, S143).

The microcomputer 100 not only provides the above-mentioned waiting display but also confirms whether the image forming operation causing the poor feeding is the single image forming operation for forming the images on only a single sheet or is the continuous image forming operation for forming the images on a plurality of sheets (step S132). In the step S132, when the poor feeding occurs in the continuous image forming operation, the transfer sheet 46 causing the poor feeding is removed, but the transfer sheets onto which the images are being transferred from the photosensitive drums 11, 12, 13 are maintained on the feeding belt 26 by the attraction force at given distances.

Accordingly, when the requirements of the S132 is satisfied, the driver **35*c* switches over or changes to use the second quartz crystal 102 in a step S133*a*, thereby actuating the feed means 39 by i seconds to shift the feeding belt 26 by at least ½ of the whole peripheral length thereof, thus separating the transfer sheets attracted to the feeding belt 26 therefrom by the separation pawl 36 to direct them to the discharge path 62**.

After the transfer sheets are discharged into the discharge path, the surface of the feeding belt 26 is cleaned by the conductive blade 37 and the electric charges is removed from the feeding belt. Further, when a feeding belt cleaning mechanism such as a rotary brush, electrostatic attraction device or the like which needs an electric power is used in place of the conductive blade 37, such cleaning mechanism is set to be actuated by i seconds in synchronous with the actuation of the feed means 39.

After the feed means 39 is actuated by i seconds, the driver 35*c* changes to use the first quartz crystal 101 in a step S133*b*, and the lamps 27, 29, 31, 50 are energized, thus judging the presence or absence of the transfer sheet 46 on the feeding belt 26 on the basis of the values of the output signals from the photodiodes 28, 30, 32, 51 (step S134). In this case, if the value of the output signal from at least one of the photodiodes differs from the reference value, i.e., if the light from any lamp 27, 29, 31 or 50 is interrupted by the transfer sheet which has not been discharged into the discharge path 62, the warning of the poor feeding is displayed on the displayer 86 (step S144), and the sequence returns to the step S127, thus waiting the removal of the transfer sheet from the feeding belt 26.

When the values of the output signals from all of the photodiodes 28, 30, 32 and 51 are normal (i.e., if YES in the step S145), the driver 35*c* changes to use the second quartz crystal 102 in a step S146*a*, and the photosensitive drums 11, 12, 13 are rotated at least one revolution, thus cleaning the surfaces of the photosensitive drums 11, 12 and 13 by the respective cleaners 23, 24 and 25 (step S146). After the photosensitive drums 11, 12, 13 are cleaned, the rising/lowering unit 44 is actuated by the actuating source 106, thus lifting the feed means 39 to the image formable position again through the rotation of the cams 43 on the basis of the detection signal of the position sensor 104 (step S136). Further, in response to the actuation of the rising/lowering unit 44, the warning of the movement of the rising/lowering unit is displayed on the control panel of the LBP apparatus 1 and the buzzer 93 is energized to emit the warning sound (step S139).

When the feed means 39 is lifted up to the image formable position, the movement of the rising/lowering unit 44 is stopped while supporting the feed means 39. In this point, the buzzer 93 is disenergized and the warning of the movement of the rising/lowering unit is disappeared, and further, the waiting display is also disappeared, whereby the LBP apparatus 1 is in preparation for the image forming operation (step S139, S140). In this way, the sequence 2 for eliminating the poor feeding as shown in FIG. 9 is completed.

Next, an example that the poor feeding of the transfer sheet occurs when the single image forming operation is carried out by the LBP apparatus 1 in the step S132 of the sequence 2 for eliminating the poor feeding will be explained.

When the poor feeding occurs in the abovementioned situation, only the transfer sheet causing the poor feeding exists in the feeding path of the transfer sheet in the LBP apparatus 1. Therefore, if the operator removes the transfer sheet causing the poor feeding in the sequence from the step S119 to the step S132, there will be no transfer sheet in the feeding path.

In the step S132 of the flow chart, when the sequence goes to the step S145 according to a certain condition (N0), as in the step S134, the lamps 27, 29, 31 and 50 are energized or lightened, thus judging the presence or absence of the transfer sheet on the feeding belt 26 on the basis of the values of the output signals from the photodiodes 28, 30, 32, 51. In the step S145, if the value of the output signal from at least one of the photodiodes differs from the set value in the microcomputer 100, the warning of the poor feeding is displayed on the control panel (step S147), and the sequence returns to the step S127, thus requesting the operator for removing the transfer sheet again When the values of the output signals from all of the photodiodes 28, 30, 32 and 51 are normal in the step S145, the sequence goes to the step S146 In the step S146, the cleaning operation of the photosensitive drums 11, 12, 13 and feeding belt 26 is carried out. More specifically, the photosensitive drums 11, 12, 13 are rotated by at least one revolution, during which the surfaces of the photosensitive drums 11, 12, 13 are cleaned by the respective cleaners 23, 24 and 25. At the same time, the feed means 39 is also actuated by i seconds to shift the feeding belt 26 by at least ½ of the whole peripheral length thereof, thus cleaning the smudge such as the colored toner adhered to the surface of the feeding belt 26 and removing the electric charge from the surface of the feeding belt 26.

Incidentally, if a feeding belt cleaning mechanism such as a rotary brush, electrostatic attraction device or the like which needs an electric power is used in place of the conductive blade 37, such cleaning mechanism is set to be actuated by i seconds in synchronous with the actuation of the feed means 39.

After the cleaning operation of the photosensitive drums 11, 12, 13 and feeding belt 26 in the step S146 is completed, the sequence goes to the step S136. From the step S136 to the step S140, the sequence carries out the same processes as those in the abovementioned sequence for eliminating the poor feeding during the continuous image forming operation in the step S132. In this way, the sequence 2 for eliminating the poor feeding is completed.

As stated above, according to the illustrated embodiment, since, when the feeding belt 26 is cleaned while separating from the photosensitive drum 11–13, the feeding belt 26 is driven at a speed faster, by three times, than the feeding speed of the belt during the image forming operation, the cleaning operation can be carried out for a time shorter than that in the conventional apparatus by one-third times, thus shortening the cleaning time of the feeding belt 26 considerably. As a result, even if the poor feeding of the transfer sheet occurs, the apparatus can be restored to the image forming condition for a very short time.

Incidentally, in the aforementioned LBP apparatus 1, in order to change the feeding speed of the feeding belt 26, the provision of the driver including different quartz crystals was adopted; however, the present invention is not limited to such provision. For example, the same effect can be obtained by frequency-dividing an output from a single quartz crystal to generate a few kinds of frequencies. Further, the feeding speed of the feeding belt 26 may be changed to various speed ratios. In addition, the motor for driving the feeding belt may be a conventional servo motor, and the change in speed of the feeding belt may be carried out by the use of a mechanical reduction gear having various speed ratios or by changing the current and/or voltage applied to the servo motor.

Furthermore, in the illustrated embodiment, while the example that the image bearing members comprise drums was explained, the present invention is not limited to this example. For example, belt-shaped image bearing members may be used with the LBP apparatus.

In addition, the image forming means is not limited to one using the image bearing member or members, but may comprise a means for forming the image by sticking or adhering ink droplets created by the use of any thermal energy generating means on the sheet, or may comprise an ink jet recording head for creating ink droplets through other various means. When the ink jet recording head is used as the image forming means, a gap so formed that the sheet does not contact with the recording head is provided between feeding means and the recording head.

Further, the present invention is applicable to not only the apparatus having three image forming portions as described in the above embodiment, but also an apparatus having one, two, or many other number of image forming portions. In any case, it is effective that the present invention is applied to an apparatus having a plurality of image forming portions arranged side by side along and above the belt-shaped feed means.

Further, as to the feeding belt cleaning means, in place of the blade, a rotary brush contacted with the feeding belt, an electrostatic attraction force, an air flow, an adhesion force or other means may be used.

In the illustrated embodiment, while the feed means was lowered and lifted, the image forming means may be lifted and lowered, or both of them may be shiftable, to carry out the separation between the feed means and the image forming means. Regarding the separation means for carrying out the separation between the feed means and the image forming means, in place of the aforementioned cams, a linkage, rack and pinion, wire and pulleys or the like may be used.

In addition, in the illustrated embodiment, while the arrangement that the cleaning of the feeding belt is carried out during the removal operation of the jammed sheet was adopted, an arrangement that the cleaning of the feeding belt can be at any time may be adopted. For example, as shown in FIG. 2, a cleaning start switch 107 may be provided so that, when this switch is turned ON, the sequence after the step S124 in FIG. 9 can be carried out. In this case, the step S127 can be omitted.

Further, as shown in FIG. 2, if an arrangement that an original reading device 108 is connected to the image forming apparatus and an original image is formed on the sheet on the basis of an image forming signal emitted by turning an original image forming switch 109 to ON is adopted, the original may be set in the original reading device 108 while the cleaning operation is being carried out by actuating the cleaning start switch or jam switch 107, and, the fact that the image forming signal is generated may be stored in a RAM 110 through a control circuit when the original image forming switch 109 is turned ON, and, after cleaning (step S212 in FIG. 19), the image may be formed (steps S214, S215) on the basis of the memory in the RAM 110 (step S213).

Figure 11:
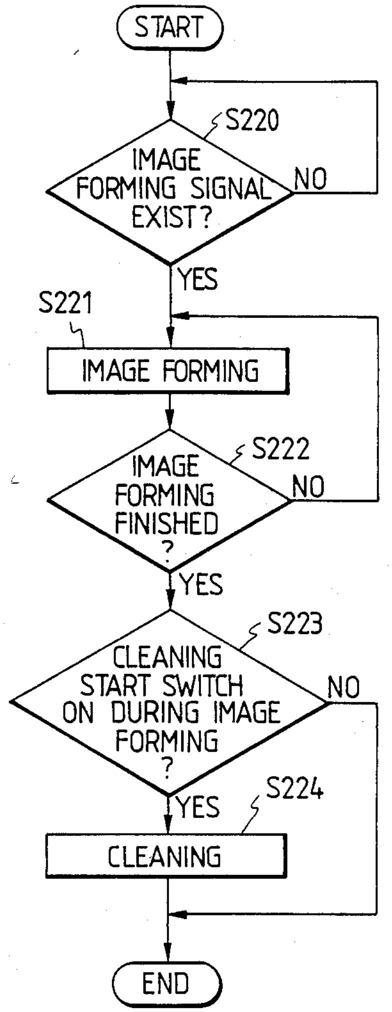

Further, as shown in a flow chart in FIG. 11, the fact that the cleaning start signal is generated may be stored in the RAM 110 when the cleaning start switch 107 is turned ON during the image forming on the basis of the image forming signal, and, after the image formation (step S222), the cleaning operation may be carried out (step S224) on the basis of the memory in the RAM 110 (step S223).

What is claimed is:

1. An image forming apparatus comprising:

a belt-shaped member for feeding a sheet;

at least one image forming means arranged in confronting relation to said belt-shaped member, for forming an image on said sheet being fed by said belt-shaped member;

a separation means for carrying out the separation between said belt-shaped member and said image forming means by shifting at least one of said belt-shaped member and image forming means;

a drive means for rotatingly driving said belt-shaped member;

a cleaning means for cleaning said belt-shaped member;

a signal generating means for emitting a signal; and a control means for carrying out separation between said belt-shaped member and said image forming means by controlling said separation means and for then rotating said belt-shaped member at a speed faster than that of said belt-shaped member during the image formation by controlling said drive means, on the basis of said signal emitted from said signal generating means.

2. An image forming apparatus according to claim 1, wherein said image forming means includes an image bearing member carrying the image thereon.

3. An image forming apparatus according to claim 1, further comprising a plurality of rotary members for supporting said belt-shaped member, and a frame for rotatably supporting said rotary members.

4. An image forming apparatus according to claim 3, wherein said separation means shifts said frame.

5. An image forming apparatus according to claim 1, wherein said cleaning means includes a blade.

6. An image forming apparatus according to claim 1, wherein said cleaning means includes a brush

7. An image forming apparatus according to claim 1, wherein said signal generating means emits said signal by detecting a jam of said sheet.

8. An image forming apparatus according to claim 1, wherein said signal generating means includes a switch.

9. An image forming apparatus comprising a feeding means for feeding a sheet;

at least one image forming means arranged in confronting relation to said feeding means, for forming an image on said sheet being fed by said feeding means;

a shifting means for changing a positional relation between said feeding means and said image forming means to a contacted condition or a separated condition, by shifting at least one of said feeding means and image forming means;

a drive means for driving said feeding means;

a cleaning means for cleaning said feeding means and a changing means for changing a driving speed of said drive means to a first speed when said positional relation between said feeding means and said image forming means is in said contacted condition and to a second speed faster than said first speed when said positional relation between said feeding means and said image forming means is in said separated condition.

10. An image forming apparatus according to claim 9, wherein said feeding means includes a belt-shaped member.

11. An image forming apparatus according to claim 10, wherein said feeding means includes a plurality of rotary members for supporting said belt-shaped member, and a frame for rotatably supporting said rotary members.

12. An image forming apparatus according to claim 9, wherein said image forming means includes an image bearing member carrying the image thereon.

13. An image forming apparatus according to claim 11, wherein said shifting means shifts said frame.

14. An image forming apparatus according to claim 13, wherein said shifting means includes cam members.

15. An image forming apparatus according to claim 10, wherein said cleaning means includes a blade contacted with said belt-shaped member.

16. An image forming apparatus according to claim 10, wherein said cleaning means includes a brush contacted with said belt-shaped member.

17. An image forming apparatus according to claim 9, wherein said drive means includes a motor.

18. An image forming apparatus according to claim 17, further comprising a pulse generating means for regulating a rotational speed of said motor.

19. An image forming apparatus according to claim 18, further including a plurality of pulse generating means, said changing means changing the driving speed of said drive means by changing said pulse generating means.

20. An image forming apparatus comprising a feeding means for feeding a sheet;

at least one image forming means arranged in confronting relation to said feeding means, for forming an image on said sheet being fed by said feeding means;

a shifting means for changing a positional relation between said feeding means and said image forming means to a contacted condition or a separated condition, by shifting at least one of said feeding means and image forming means;

a drive means for driving said feeding means;

a cleaning means for cleaning said feeding means;

a jam detection means for emitting a signal when a jam of said sheet is detected;

a jam elimination detecting means for emiting a signal when it is judged that the jammed sheet is eliminated; and a control means for stopping operations of said image forming means and said drive means and for carrying out separation between said feeding means and said image forming means through said shifting means, on the basis of said signal emitted from said jam detection means, and for performing cleaning operation by means of said cleaning means while driving said drive means at a speed faster than of said drive means during the image formation for a predetermined time, for stopping said drive means after said predetermined time is elapsed, and for changing said positional relation between said feeding means and said image forming means to said contacted condition through said shifting means, on the basis of said signal emitted from said jam elimination detecting means.

21. An image forming apparatus comprising a feeding means for feeding a sheet;

at least one image forming means arranged in confronting relation to said feeding means, for forming an image on said sheet being fed by said feeding means;

a shifting means for changing a positional relation between said feeding means and said image forming means to a first condition that image formation is carried out or a second condition that the image formation is not carried out, by shifting at least one of said feeding means and image forming means;

a drive means for driving said feeding means;

a cleaning means for cleaning said feeding means;

a signal generating means for emitting a signal;

a changing means for changing driving speed of said drive means to a first speed or to a second speed faster than said first speed; and a control means for changing said first condition to said second condition by controlling said shifting means and for changing said first speed to said second speed, on the basis of said signal emitted from said signal generating means.

* * * * *